No. 783,367.     Patented February 21, 1905.

UNITED STATES PATENT OFFICE.

GEORGE P. CRAIGHILL, OF LYNCHBURG, VIRGINIA, ASSIGNOR OF TWO-THIRDS TO CHARLES E. HEALD AND ERNEST WILLIAMS, OF LYNCHBURG, VIRGINIA.

PRODUCING ROSIN.

SPECIFICATION forming part of Letters Patent No. 783,367, dated February 21, 1905.

Application filed October 6, 1903. Serial No. 175,983.

*To all whom it may concern:*

Be it known that I, GEORGE P. CRAIGHILL, of Lynchburg, in the county of Campbell and State of Virginia, have invented certain new and useful Improvements in Producing Rosin; and I do hereby declare the following to be a full, clear, and exact description of the invention, such as will enable others skilled in the art to which it appertains to make and use the same.

The object of this invention is to provide an improved, simple, and inexpensive process for producing commercial rosin from pine wood by a volatile solvent, which with but a minimum loss may be recovered from the solution and again used for the same purpose and which solvent will disturb neither the chemical nor other impurities inherent in the wood, the presence whereof in the extracted products would render subsequent treatment necessary.

The invention will now be fully set forth, and its essentials particularly pointed out in the claim.

In carrying out my invention, sawdust, chips, shavings, or slivers of the wood, prepared or produced in any well-known way from the trunk of a tree or from stumps, roots, or slabs, heretofore regarded as waste, are placed in a closed extractor or retort and then saturated by submersion in alcohol, which has the property of absorbing or dissolving the resinous constituents of wood and which may be recovered for further use, but which will disturb neither the chemical nor other impurities inherent in the wood—those of calcium, potassium, sodium, &c. While so saturated the mass is heated either by the use of steam-coils within the extractor or by external application, such heating continuing until perfect exhaustion of the wood is effected. Heat is not, however, really essential to the process, as the extraction can be made at almost any temperature; but it is facilitated by the use of heat in varying degrees. The resinous constituents thus extracted are held in a solution which may then be transferred into a suitable still, where it is subjected to a degree of heat sufficient to recover the alcohol with but minimum loss. The residue after the alcohol has been separated from it by distillation will be an oleoresin resembling both in appearance and quality the gum which exudes naturally from pine-trees and free of the alkaline salts natural to the wood, as well as other impurities. The distillation of this oleoresin may be continued in the same apparatus by the application of a higher degree of heat, and the turpentine thus recovered by the usual method of distillation, the residue being commercial rosin or the oleoresin can be transferred and distilled by the usual methods for manufacturing turpentine from the natural gum.

Now it will be seen that all fractional or destructive distillation is avoided. In consequence not only am I enabled to produce turpentine and rosin and at the same time to recover nearly all the alcohol, which may be kept for further use, but the wood is left in a condition allowing of its being employed in the manufacture of high-grade paper, as the fiber natural to the wood has not been impaired nor has the solvent extracted therefrom the alkaline salts or other impurities. If these salts were extracted along with the resins, their presence in the oleoresin would render it necessary to subject the turpentine and rosin to subsequent refining; but by my invention this is avoided, thus saving both time and labor, with a resultant saving of expense.

In carrying out my invention the results are obtained more economically by connecting in tandem a series of extractors of ordinary or well-known design, in each of which wood is placed in contact with the alcohol, with or without heat. The solution resulting in the first extractor is forced by any method, preferably by pump or pneumatic pressure, into the second extractor and brought into contact with fresh wood and then forced into the third extractor and brought again into contact with fresh wood, the density of the solution being increased each time it is brought into contact with the wood. This is continued until the desired density is reached, and the solution is then distilled in the manner stated. The wood remaining in the extractors is treated with another supply of alcohol and the process repeated until all the oleoresin properties of the wood are extracted. The wood is then withdrawn and the extractors refilled *seriatim* with fresh wood and the process continued as before. The process thus becomes continuous, the number of applications of the alcohol to the wood being governed by the number of extractors.
It is not essential in my process to have a series of extractors, as the action of the alcohol on the wood is to almost instantaneously dissolve the turpentine and other resins from the wood. The only use of a series of extractors is to increase the density of the solution, and thus to cheapen the cost of the production by lessening the quantity of the solution to be evaporated or distilled.

I claim as my invention—

The process herein described of producing rosin from pine wood, consisting in, first, saturating or submerging the wood, with or without heat, in alcohol, by which oleoresin is extracted and held in solution, disturbing neither the chemical nor other impurities inherent in the wood, and then heating the solution, first, to recover the alcohol, and secondly, to distil the turpentine, the residue being commercially pure rosin.

In testimony whereof I have signed this specification in the presence of two subscribing witnesses.

GEORGE P. CRAIGHILL.

Witnesses:
 J. NOTA McGILL,
 FRANCIS S. MAGUIRE.